Jan. 18, 1938.　　　F. W. DOUTHITT　　　2,105,525
CORN EAR TRIMMER
Filed Oct. 1, 1936　　　4 Sheets-Sheet 1

INVENTOR
Frank W. Douthitt
By his Attorney

Jan. 18, 1938.     F. W. DOUTHITT     2,105,525
CORN EAR TRIMMER
Filed Oct. 1, 1936     4 Sheets-Sheet 2

INVENTOR
Frank W. Douthitt
By his Attorneys
Merchant & Kilgore

Jan. 18, 1938.　　　F. W. DOUTHITT　　　2,105,525
CORN EAR TRIMMER
Filed Oct. 1, 1936　　　4 Sheets-Sheet 3

INVENTOR
Frank W. Douthitt
By his Attorneys

Jan. 18, 1938.　　　F. W. DOUTHITT　　　2,105,525
CORN EAR TRIMMER
Filed Oct. 1, 1936　　　4 Sheets-Sheet 4

INVENTOR
Frank W. Douthitt
By his Attorneys
Merchant & Kilgore

Patented Jan. 18, 1938

2,105,525

UNITED STATES PATENT OFFICE 2,105,525

CORN EAR TRIMMER

Frank W. Douthitt, Ortonville, Minn.

Application October 1, 1936, Serial No. 103,503

4 Claims. (Cl. 146—84)

My present invention relates to the art of canning corn, and provides a machine for rapidly, economically and accurately performing one of the important operations in the preparation of ears of corn for canning on the cob. Ears canned on the cob must be of uniform or predetermined length to properly fill the cans. This machine performs the operation of trimming or cutting off the ends of the corn ears.

A commercial form of the machine for performing the above operation is illustrated in the accompanying drawings. In the operation of this machine, the husked but untrimmed ears of corn are, by hand or otherwise, placed upon the upper run of a long horizontally disposed endless carrier belt that runs past and in close association with a gang or battery of trimming devices. Each unit of the trimming mechanism involves a feed wheel and a pair of laterally spaced cutters. In this commercial illustration of the machine, the laterally spaced cutters are sharp-edged rotary cutting discs and the co-operating feed wheel is an intermittently driven drum-like wheel provided with transversely extended circumferentially spaced peripheral ear-receiving pockets or grooves.

The untrimmed ears will be taken from one of the runs, preferably the upper run, of the feed belt and placed in the pockets of the feed wheel or drum; and the trimmed ears will be delivered onto the other, to wit: as illustrated, the lower run of the feed belt, while the trimmings from the ends of the ear will be caught and delivered away from the feed belt. From the lower run of the feed belt, the trimmed ears will be discharged or delivered manually or otherwise, as by a fixed deflector.

To enable one operator to work economically for the removal of the untrimmed ears from the feed belt to the pocketed feed wheel, the feed wheels and co-operating cutters are arranged in pairs so that the feed wheels of the pair are properly spaced for the performance of the indicated manual operation. In a highly efficient machine, the pairs of feed wheels and cutters are multiplied and arranged in a battery which may be extended to any desired extent. The feed belt is arranged to run past all of the trimmer units, using a very long feed belt, which serves to carry the untrimmed corn ears from a distant receiving place and to deliver the trimmed ears at a point past the battery of trimmers and to a suitable point where the trimmed ears will be received for the completion of the canning operation.

In the drawings, wherein like characters indicate like parts throughout the several views:—

Figure 1:
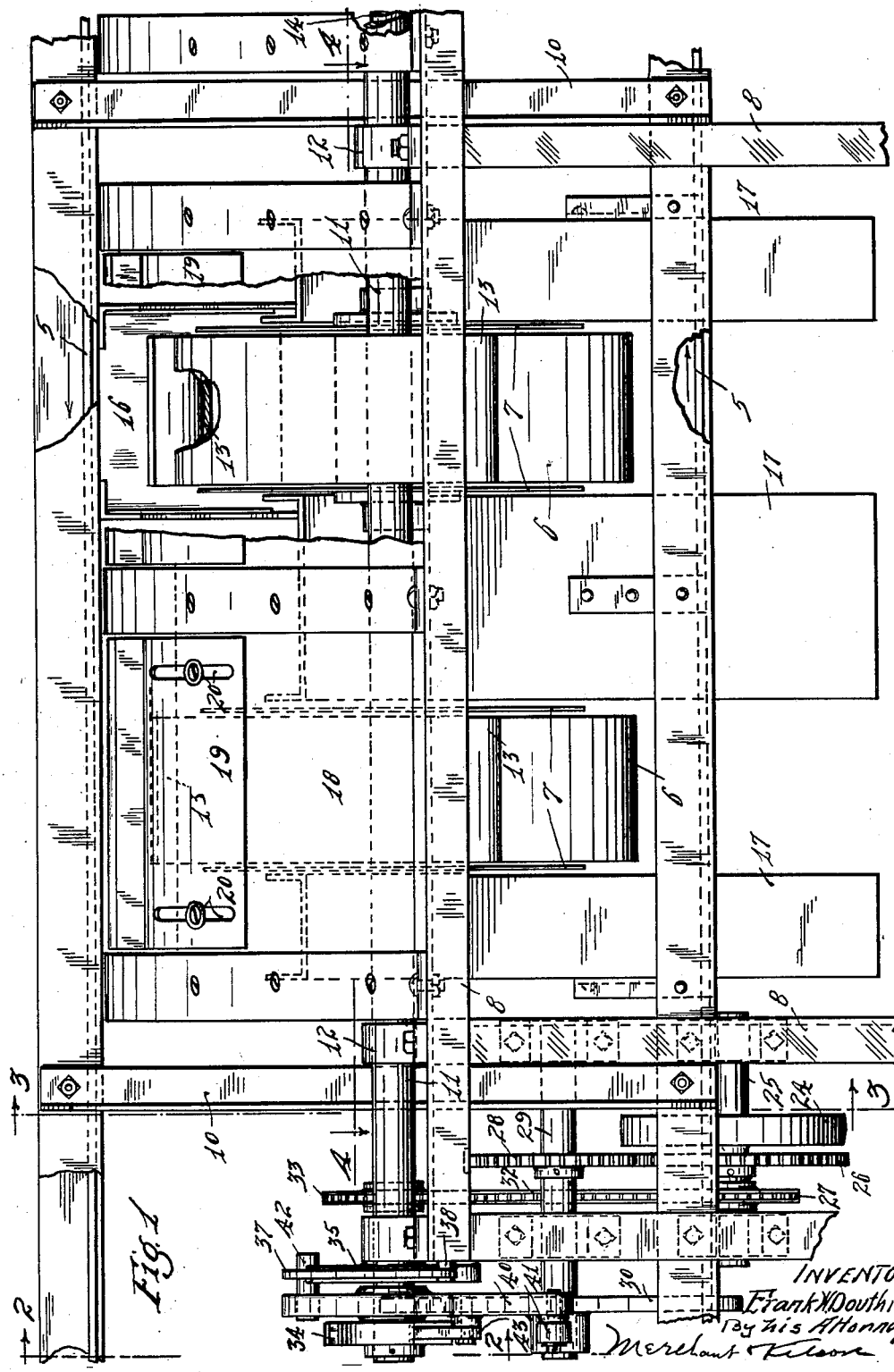
Fig. 1 is an elevation looking at the machine from the operator's side, some parts being broken away.

Of the above noted chief elements of the machine, the numeral 5 indicates the long horizontally disposed endless conveyor belt, the numeral 6, the feed wheel, and the numeral 7 the disc-like cutting knives. These elements, through devices presently to be noted, are supported either directly or indirectly from a rectangular skeleton main frame 8, as shown and preferably made up of vertically and horizontally disposed rigidly connected angle irons or beams of any suitable nature. The upper and lower runs of the feed belt 5 are arranged to run upon upper and lower guide rails 9, preferably and as shown in the form of angle irons, rigidly secured to vertically disposed supplemental frame members 10, which, in turn, are rigidly secured to the horizontal members of the main frame 8. This feed belt 5, as already stated, may be a very long belt and, in practice, extends along a course of several hundred feet, although the angle thereof may be varied, at will, according to the location of the place of delivery of the untrimmed corn ears thereto and the delivery of the trimmed corn ears therefrom. This belt 5 will be power-driven and may be thus driven by any of the well-known means such as guide wheels or rollers mounted at the receiving and delivery portions of the belt. Also those portions of the guide rails 9 that extend beyond the main frame 8 may be supported by any suitable additional means.

Figure 3:
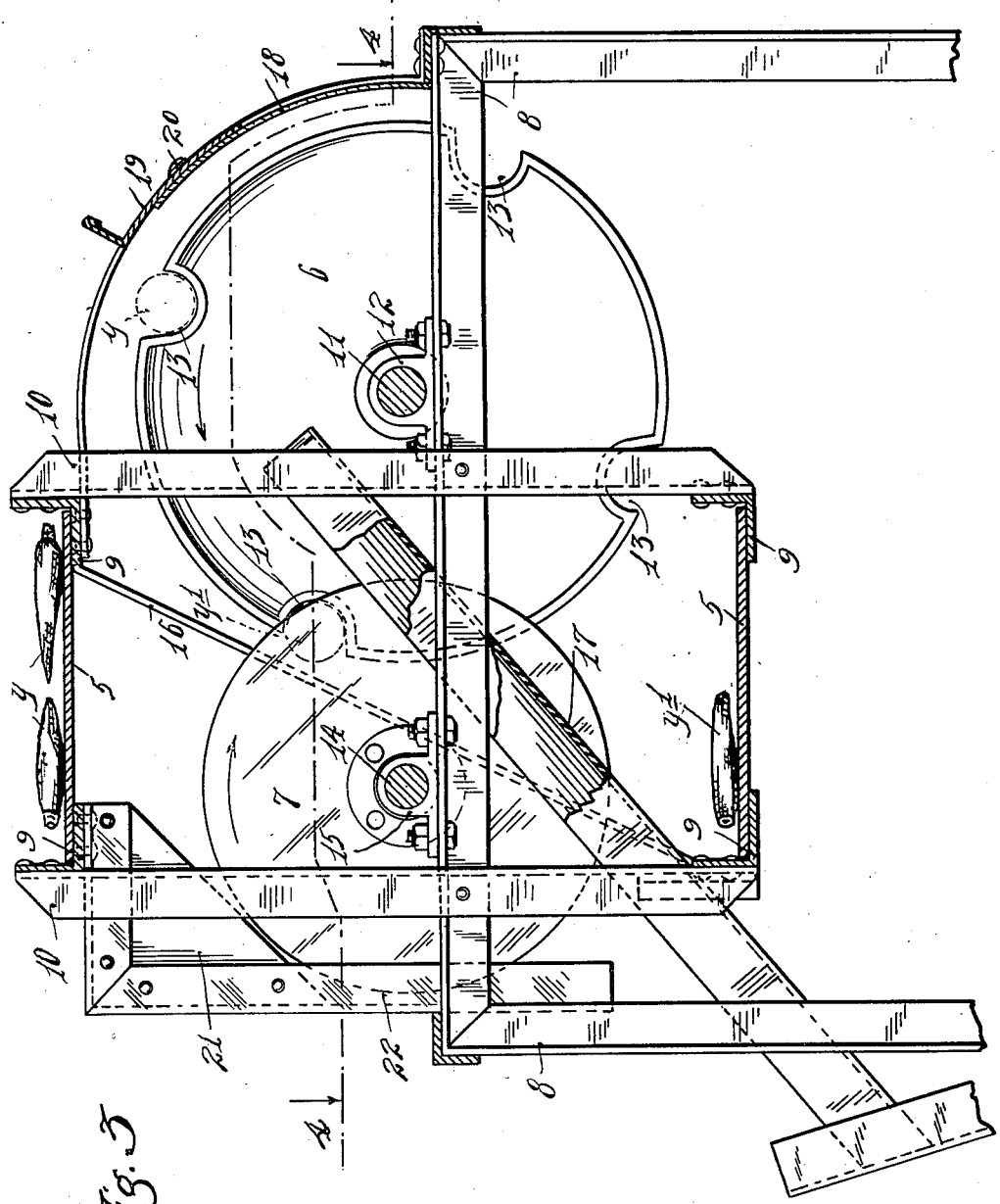
Fig. 3 is a vertical section taken on the line 3—3 of Fig. 1.
Figure 4:
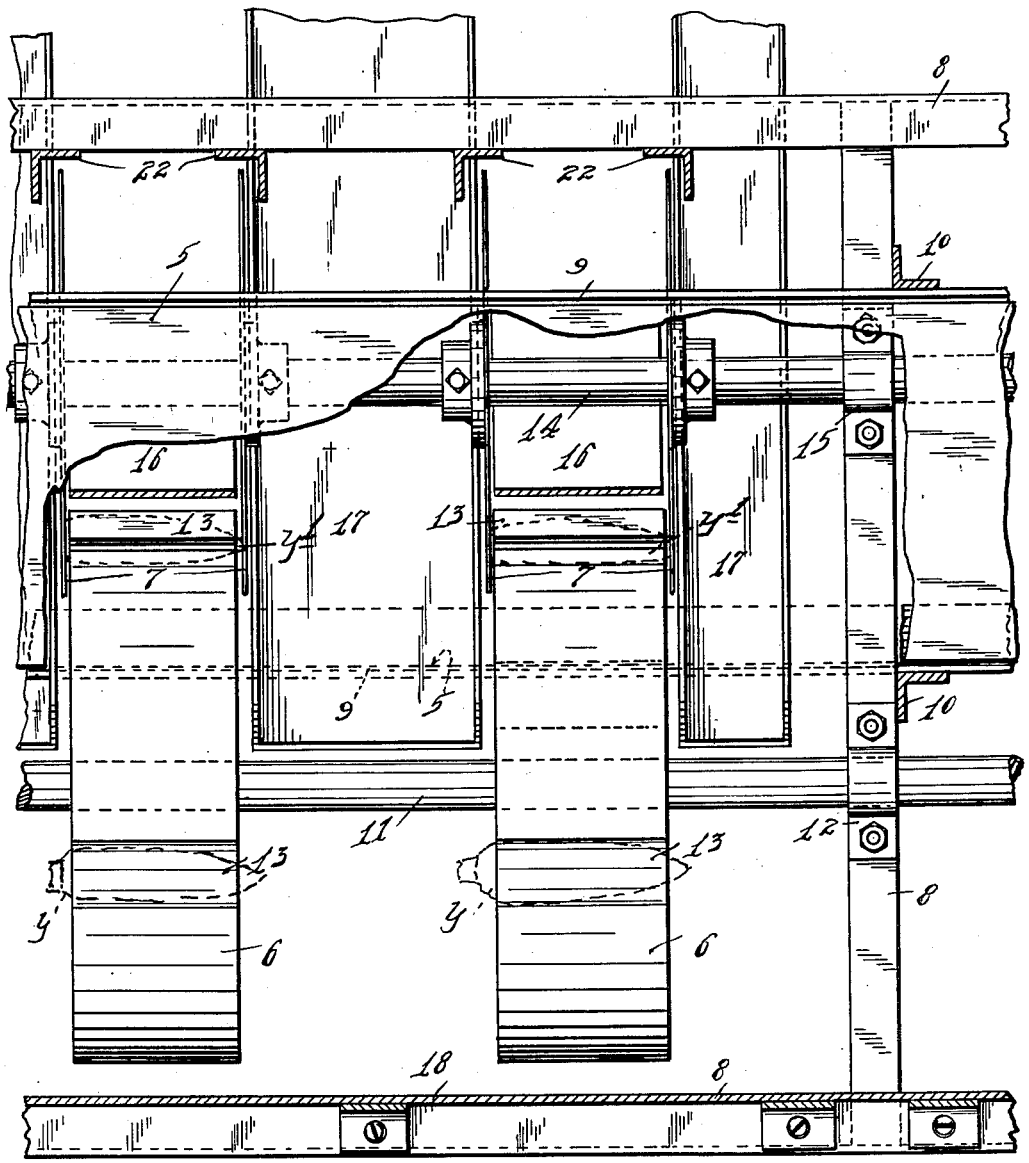
Fig. 4 is a horizontal section taken approximately on the line 4—4 of Fig. 1, with some parts above the section line shown in full.

In Fig. 3, husked but untrimmed ears of corn placed on the upper run of the belt 5 are indicated by the character $y$, and a trimmed ear carried on the lower run or portion of said belt is indicated by the character $y^1$.

The feed wheels or drums 6 are secured to a shaft 11 journaled in suitable bearings 12 on the main frame 8. This shaft 11 extends parallel to the line of travel of the belt 5 and is so mounted on the frame 8 that the delivery portions of said feed wheels extend into the space between the upper and lower runs of the feed belt 5, see particularly Fig. 3. The feed wheels 6 are provided with circumferentially spaced transversely extended peripheral pockets 13 that are adapted to receive the ears and carry the same to the cutters 7.

The disc-like cutters 7 are secured to a shaft 14 that is journaled in suitable bearings 15 on the frame 8 and extends parallel to the shaft 11. The cutting discs 7 are arranged in pairs that are so spaced and so located in respect to the co-operating feed wheel 6 that the ears of corn will be carried past the cutting edges of said discs and the ends of the ears will be cut or trimmed off so that the ears delivered from the machine will all be of the same length. The extent to which the feed wheel works between the co-operating pair of cutters is best shown in Fig. 3.

To insure dropping of the trimmed ears onto the lower run of the belt 5, a deflecting board or plate 16 is obliquely supported, as shown from an upper and a lower rail 9. This deflector 16 is of such width that it extends between the co-operating cutters 7 free from contact therewith.

For catching the trimmed off ends of the corn ears, there is shown a pair of oblique troughs 17 suitably supported from the frame 8 and located one just outside of each cutting disc 7 and in position to receive the trimmings as they are dropped from the ear, and deliver the same to a suitable receptacle or other suitable point for discharge.

The operators will stand at the right-hand side of the machine as viewed in Fig. 3, and the adjacent portions of the feed wheels 6 are covered by segmental shields 18, preferably of sheet metal, rigidly secured to the framework 8 at their lower portions. These shields 18 are provided with adjustable supplemental sections 19 secured thereto for sliding movements by slot and screw connections 20, see Figs. 2 and 3, so that the shield may be extended nearly up to alignment with the uppermost pocket 13. The purpose of this adjustment will later more fully appear after having described the means for imparting intermittent step by step movement to the feed wheels 6.

At that side of the machine which is opposite to the operator's side, the disc-like cutting or trimming knives 7 are covered or guarded by a yielding structure 21, shown as supported by posts 22 rigidly secured to and projecting from the main frame 8 and attached at their upper portions to one of the rails 9.

The rotary knives 7 will be continuously driven when the machine is in action, and as indicated, the feed wheels 6 will be intermittently operated. The power transmission mechanism by which the above noted movements are accomplished and which are preferably employed, are as follows: Power is delivered to this transmission mechanism through a power-driven belt 23 that runs over a pulley 24 secured on a short counter-shaft 25 journaled in suitable bearings on the main frame 8. The shaft 25, in addition to the pulley 24, carries a spur gear 26 and a sprocket 27. Gear 26 meshes with gear 28 on a short counter-shaft 29 also journaled in suitable bearings on the main frame 8. This shaft 29 also carries a crank-acting member which, as shown, is in the form of a disc 30 having a wrist pin 31. A sprocket chain 32 runs over the sprocket 27 of shaft 25 and over a sprocket 33 that is carried by the counter-shaft 14.

Figure 2:
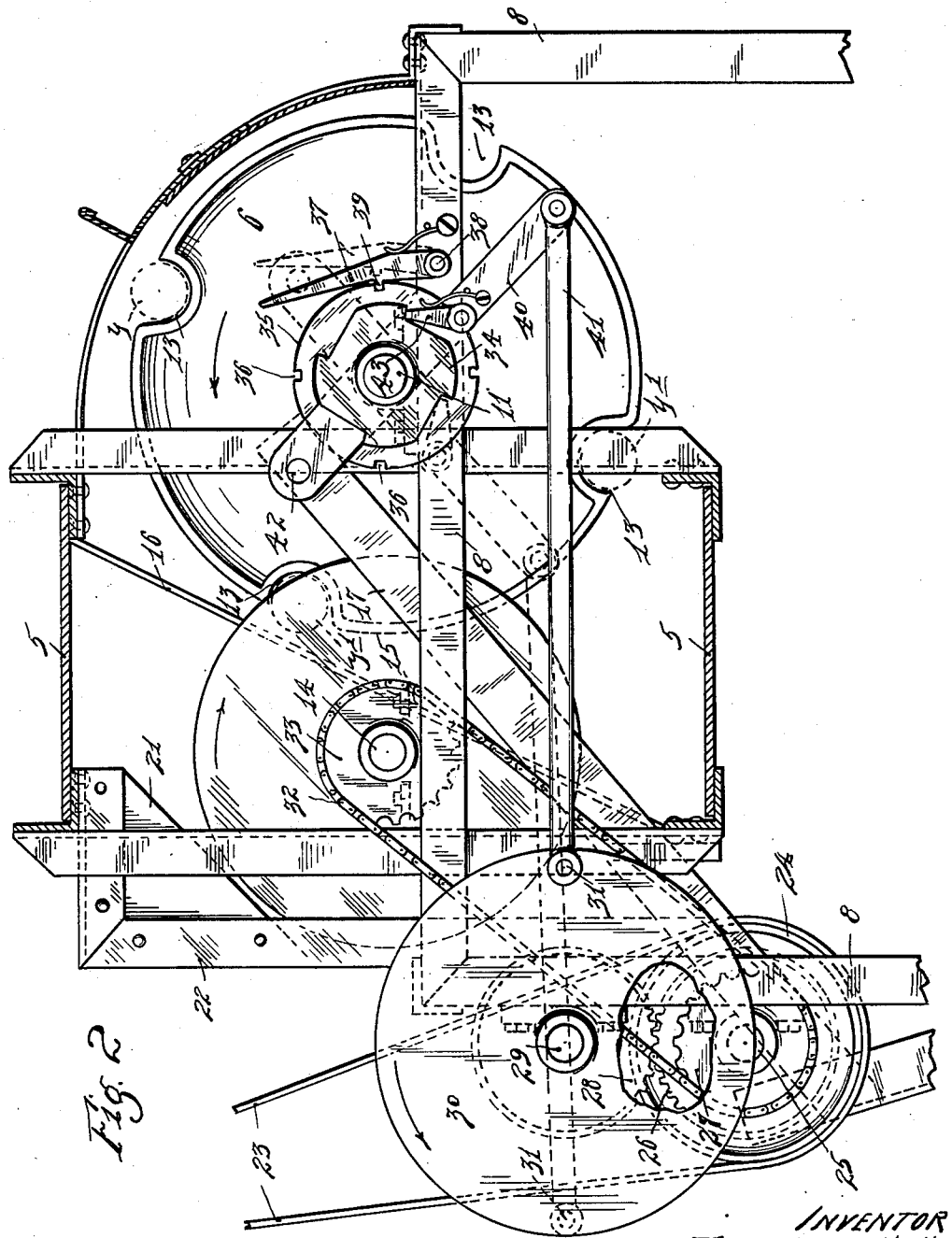
Fig. 2 is a transverse vertical section taken on the line 2—2 of Fig. 1.

The feed wheel shaft 11, see Figs. 1 and 2, carries a toothed or ratchet wheel 34 and a lock disc or flange 35. The feed wheels 6 are provided each with four receiving pockets 13 and hence the ratchet wheel 34 has four teeth and the lock disc or flange 35 has four lock notches 36.

Normally the feed wheels are locked in positions shown in Figs. 2 and 3, by a spring-pressed lock dog 37 that is pivoted to the main frame at 38 and is provided with a detent or lock lug 39 that engages one of the lock notches 36. A lever in the form of a rocker bar 40 is intermediately pivoted on the shaft 11 and its lower end is connected by a long coupling rod 41 to the wrist pin 31 of the crank-acting disc 30. The upper end of lever 40 has a lateral projection 42 in the form of a projecting stud or pin that is engageable with the upper end of the spring-pressed lock lever 37 to release the latter when the lever 40 is moved to the dotted line position shown in Fig. 2. For action on the ratchet wheel 34, lever 40 is provided with a spring-pressed impelling dog or pawl 43.

Summary of operation

When the machine is in operation the feed belt 5 will be continuously driven and its upper run will continuously feed the husked but untrimmed corn ears to positions in front of the space between each of the two feed wheels 6 that make up the pairs of the battery. The operators thus standing will take from the upper run of the feed belt an ear of corn in each hand and will place the same in the notches or pockets 13 of the feed wheel 6 that are immediately at the right and left.

At the time just stated the feed wheels 6 will be at rest each with a pocket 13 just beyond the properly adjusted shield section 19. While these depositing operations are being manually performed the rotary cutting discs or knives 7, and the crank disc 30 will be continuously rotating in the direction of arrows marked thereon in Figure 2; and during that time, under the action of crank pin 31 and connecting rod 41, lever 40 will be given its retracted movement from the position indicated by the full lines in Figure 2, into position indicated by dotted lines in said view. When lever 40 closely approaches said dotted line position its lug or projection 42 will engage the free end of lock dog 37 and move the same into its dotted line position Fig. 2 thereby releasing shaft 11 and feed wheels 6 for rotation in a counter-clockwise direction in respect to Fig. 2. The above retracting movement of lever 40 was performed under a half rotation of crank disc 30. During the next half rotation of said crank disc in the direction of the arrow marked thereon in Fig. 2, lever 40 will be moved from its dotted line position back to its full line position Fig. 2, thereby causing the dog 43 to impart to the feed wheels a ¼ (one-fourth) rotation or movement to 90°. This step of movement thus imparted to the carrier wheels not only brings new pockets into receiving positions, but carries the previously deposited ears of corn past the rotary cutters thereby trimming off the ends of the corn ears and dropping the trimmed ears on to the lower run of the feed belt 5, while the trimmings will be dropped into the discharged spouts or chutes 17, as earlier described.

The upper run of the feed belt 5 will, of course, travel in a direction from right toward the left, while the lower run of said belt will travel from left toward the right or in the direction of arrows marked adjacent thereto, Fig. 1.

Hence, the untrimmed corn will be fed to and past the operators and the trimmed ears will be carried in a reverse direction from the operators' location back toward the place in which the untrimmed corn was supplied.

Obviously the spring-pressed lock dog 37 will engage and lock the lock disc or flange 35, and hence the feed wheels against rotation, the very instant that the said rotary elements have been positioned to receive new ears of corn, as indicated by the full lines in Fig. 2. It is important to note that the tripping log 42, when lever 40 is in the dotted line position Fig. 2, forces the lug 39 of the lock dog a considerable distance away from the periphery of the lock disc 35 so that under operative movement of lever 40 dog 43 will impart to the rotary elements that slight movement which is necessary to prevent lock lug 39 from re-entering a notch 36 until the said rotary elements have been given their complete step of movement, to wit: in the arrangement described in 90° of rotation.

What I claim is:

1. In a machine of the kind described, an endless conveyor having upper and lower runs, the former for carrying untrimmed corn ears and the latter for carrying trimmed corn ears, a feed wheel having open circumferentially spaced transverse corn ear pockets and being mounted to turn transversely of the conveyor, with the downwardly moving surface thereof extending between the runs of the conveyor, whereby corn ears manually taken from the upper run of the conveyor and deposited in the pockets of the feed wheel, will drop by gravity from the pockets during turning of the feed wheel and be deposited on the lower run of the conveyor, and a pair of axially spaced trimming knives between which the feed wheel turns and to which knives the corn ears, in the pockets of the feed wheel, are successively delivered to trim the ends thereof, said trimming knives being arranged to trim the corn ears while being moved by the feed wheel between the runs of the conveyor.

2. The structure defined in claim 1 which further includes means for preventing the corn ears from dropping out of the pockets in the feed wheel during their approach to the trimming knives.

3. The structure defined in claim 1 which further includes means for intermittently moving the feed wheel to successively position the pockets therein for a period of rest to receive a corn ear just prior to the time the respective pocket passes between the runs of the conveyor.

4. The structure defined in claim 1 which further includes means extending between the upper and lower runs of the conveyor for catching the trimmings from the corn ears and carrying the same away from the conveyor.

FRANK W. DOUTHITT.